Feb. 22, 1949.  P. S. WEBB ET AL  2,462,242
SILICONE SURFACED COOKING IMPLEMENT
Filed April 6, 1948
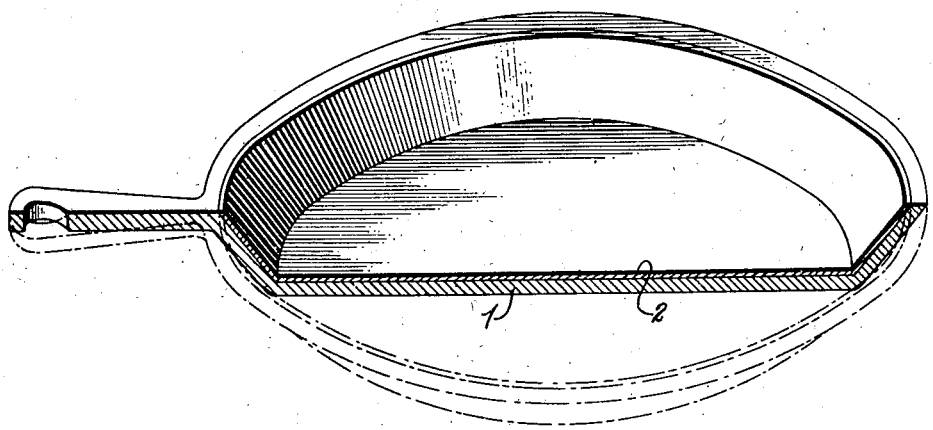
Inventors
Paul S. Webb and
John R. Koster
BY John Ewbank
ATTORNEY Patented Feb. 22, 1949

2,462,242

UNITED STATES PATENT OFFICE 2,462,242

SILICONE SURFACED COOKING IMPLEMENT

Paul S. Webb and John R. Koster,
Boulder City, Nev.

Application April 6, 1948, Serial No. 19,353

3 Claims. (Cl. 220—64)

Our invention relates to a method of treating surfaces of implements and vessels used in connection with food handling industries, and is a continuation-in-part of our co-pending application, Serial No. 735,258, filed March 17, 1947.

By cooking implements, it is to be understood that we mean any type of equipment used primarily for handling and cooking food on food stoves, such as sauce pans, frying pans, baking tins, and mixer equipment, as well as such auxiliary equipment as knives, forks, spatulas, pancake turners and such other equipment used for handling and processing food either commercially or domestically.

The cooking and food handling industry has spent a great deal of money, effort and time in attempting to design and develop cooking utensils and auxiliary equipment which are resistant to corrosion and staining, and which are easily cleaned.

It is among the objects of this invention to produce a cooking utensil which will remain at all times resistant to corrosion or staining and which may be very easily cleaned. Our new and improved cooking utensil can be made of such high heat conducting materials as aluminum or copper, and if treated in accordance with our invention will be highly resistant to corrosion and/or repellant to the adhesion of food stuffs or carbon in the event a cooking utensil is overheated.

As is well known, substantially all cooking utensils become highly discolored and stained with carbon or other chemicals on the bottom side when in contact with an open flame of a gas-burning stove. No effective method has heretofore been found for keeping the bottom of such pots and pans clean.

It is also among the objects and advantages of our invention to provide a cooking utensil which when treated in accordance with our invention will substantially prevent the discoloring or staining of the bottom of the cooking utensils exposed to direct or open flames.

In the use of some cooking implements, such as frying pans, pancake turners and spatulas, in frying eggs or pancakes or the like, it has been necessary to use considerable quantities of greases or fats to prevent the food stuffs being cooked from sticking to the bottom of the pan or to the spatula or pancake turners.

It is a further object of our invention to so prepare such cooking utensils and implements that the necessity for the use of fats, oils or greases is entirely eliminated. A further disadvantage of cooking utensils heretofore known lies in the disagreeable task of cleaning the utensils after they have been used. In substantially all cooking ware, considerable amount of energy must be expended in scrubbing the interior of the utensil in order to render it clean and sanitary.

It is a further object of our invention to produce a cooking utensil or implement which, if treated according to our invention, may be cleaned and returned to a bright and shiny condition by wiping it out with a damp cloth, or by treating it with a jet of live steam or in an autoclave sterilizer if more sterile conditions are required.

The cooking implements discussed above are all of the type which are heated from the underneath side by an open flame, electric heating unit, or other suitable means. Such sub-fired cooking implements are to be clearly distinguished from baking vessels used in ovens. Although housewives have heretofore encountered a small amount of trouble from stuck food in baking vessels, the difficulties experienced from food stuck to sauce pans, skillets, and other sub-fired vessels has been hundreds of times greater because of the difficulties in heat transfer, localized heating and other factors. As regards food sticking, the distinction between sub-fired cooking implements and oven implements is much more important than the distinctions between these two classes of pans as regards other matters.

In the baking operations there are important differences as regards the ease of cleaning the baking implements and more especially as regards the tendency of the food to stick to the baking pans between bread baking and other kinds of baking. The difficulties encountered by housewives and commercial bakers in the sticking of bread has been only a very small fraction of the difficulty encountered in the making of other baked goods.

The operation of baking, as well as the skillet and broiler operations, are examples of high temperature cooking, which is to be sharply distinguished from low temperature cooking. The cooking in sauce pans, pressure cookers, and the like provide examples of low temperature cooking. Many people have preference for fried eggs over boiled eggs. There are numerous people who prefer food cooked at a high temperature to food cooked at a low temperature cooking. It has long been standard practice to employ grease for such high temperature cooking. Persons on special diets have sometimes been denied the products of high temperature cooking because of the desirability of minimizing the fat content of their diet. Individuals having aversion to fat flavors have also avoided the products of high temperature cooking. Although there has been a widespread demand for a suitable means for high temperature cooking without fats, no such means has come into general use. In referring to fats the natural meat fats, vegetable oils, shortening, and other materials used for frying are included.

It is an important object to the present invention to provide a novel coating composition especially designed for improving the operation of food implements.

An important object of the invention is to provide several processes related to the previously discussed objects, including a method of applying a coating to a food implement, a method of cleaning food implements, and a method of high temperature greaseless cooking.

A feature of the invention is the provision of a coating composition applicable to food implements, and capable of forming on the food implement a relatively permanent surface to which food will not ordinarily stick.

Further features of the invention include the provision of improved implements, the provision of cooking implements, both oven heated and subfired, having their cooking surfaces treated in such a manner as to minimize the possibility of food sticking thereto, the provision of cooking surfaces adapted for high temperature greaseless cooking, the provision of a method of applying coating compositions to food implements, the provision of a method of cleaning food implements, the provision of a method of high temperature greaseless cooking and the provision of good implement coating applicators.

Before describing the invention in detail, it should be understood that the examples are given by way of illustration, and not as limitations of the invention, which is accurately defined in the claims.

The new article of manufacture consists of a food implement having a surface consisting of a specially selected coating of a polymeric silicone.

In the drawing there is shown a partially sectioned perspective view of a frying pan. A metallic cooking implement 1 is illustrated to indicate that it has a thin coating 2 of a permanently viscous silicone at the surfaces utilized as cooking surfaces.

In accordance with our invention, a cooking implement of any material is first cleaned in such a way that it is completely free of any contamination on its surface. We prefer treating newly manufactured cooking implements because there has been no opportunity for the burning or baking of carbon or other contaminating substances into the surface of the material. If the implement used is newly manufactured usually a wash with soap and water will be sufficient to prepare the surface. After the application of soap and water the cooking implement is then rinsed with distilled water and heated to drive off all moisture to make sure the surface is absolutely dry.

In the event it is felt the surface is contaminated with substances which will not be removed by ordinary soap and water, a very effective method of cleaning such surface is as follows: In the case of stainless steel, we have found it highly satisfactory to clean the surface with an alkali rinse and then pickle in a solution of nitric acid and hydrofluoric acid containing approximately 10% nitric acid and 2% hydrofluoric by volume. After the surface has been pickled in the solution, it is rinsed with distilled water and dried. The drying operation may be accomplished either by baking or by a blast of hot air. In the case of aluminum we have found a pickling solution containing approximately 2% hydrofluoric acid highly effective, and one which will leave a relatively bright surface after its application. The implement is then rinsed with distilled water and dried.

The cleaned surface is then treated or coated with a thin layer or application of an organo-silicon compound. The organo-silicon compounds, commonly known as "silicones" are obtained by the linking of silicon atoms to the carbon atoms of alkyl or aryl silicon hydroxy compounds. These latter are capable of condensation with loss of water to complex polymers of great stability and will not break down under temperatures which are extreme for cooking purposes.

The term "silicones" has the general meaning of designating compositions which are chemically described as alkylated chains of alternate silicon atoms and oxygen atoms, sometimes containing side chains, rings and/or cross-links. Various substituted or unsubstituted aliphatic radicals, such as the methyl, ethyl, chloromethyl, hydroxymethyl, or isopropyl radicals, and/or various substituted or unsubstituted aryl radicals such as the phenyl, tolyl, xylyl, chlorophenyl, dichlorophenyl, or naphthyl may be the alkyl constituents of the silicones marketed commercially by the silicone manufacturers.

As pointed out previously, not every kind of a silicone is suitable for the advantageous coating of the present invention. In order to be suitable the silicone must have several important properties discussed hereinafter. According to the present invention the silicone should have a high degree of adhesive affinity for a metallic surface. Not all silicones have the tendency to adhere and form a suitable film on the metallic surface.

Silicones can be classified as thermosetting and those free from thermosetting properties. Those silicones having no thermosetting properties are sometimes described as having a thermal viscosity stability. That is, it should be possible to frequently heat and reheat for prolonged periods of time the silicone without significantly affecting its room temperature viscosity.

In addition to having temperature viscosity stability, the silicone for the preferred coating compositions of the present invention should have a viscosity at room temperature of 200 centistokes or more. The silicones of the present invention must have a decomposition temperature above 500° F. The silicones of the present invention should be insoluble in olein or other typical animal and vegetable oils or fats.

There are a number of other properties which the silicones should desirably have, but which are not of the extremely critical importance of the properties outlined above. For example, the silicones should be substantially free from sulphur. The alkyl groups of the silicone should not be substituted with mercaptans or with other groups likely to lead to odors or decomposition. It is usually desirable to employ silicones characterized by the unsubstituted alkyl group. Those silicones having multicarbon alkyl substituents are slightly preferred over the methyl silicones. Those silicones having a decomposition temperature of above 500° F. are preferred. Especially satisfactory results have been obtained in using the silicones having at room temperature the consistency of a thin petrolatum; that is, having some tendency to maintain their shape, but having an extremely small resistance to penetration. Inasmuch as the silicones are employed on food implements, they should not contain detectable traces of arsenic or other poisonous components. A theory has been developed that the fact that the silicones are not thermosetting makes possible a high degree of self-healing film properties able to withstand long periods of normal use.

Not only must the silicones have certain important properties, but also the solvent should be carefully selected to accomplish the purpose of the present invention. High boiling solvents of the class of tetralin (tetrahydronaphthalene) and isobutyl benzene are unsuited for the present invention. Only volatile solvents are suitable for the coating compositions of the present invention. Solvents having a highly offensive odor, such as amylmercaptan, carbondisulphide, or the like, cannot be used because the coating composition is designed for application by the housewife in the kitchen. Solvents such as acetic acid are not suitable. Particular importance is placed upon the fact that during the development of the present invention, it was found that solvents such as ethylene diamine, nitrobenzene, and the like, could not be employed because of the desirability of minimizing the chance of irritating the finger or other portions of the skin contacted by the solvent during application of the coating composition to the food implement. Hence it was found that the solvent must possess the properties of being non-irritating to the skin at the concentrations, for the time periods and under the conditions to be expected during its normal use.

Several other properties which the solvent should desirably, but not necessarily, possess were discovered. Those solvents which are non-inflammable have certain advantages over the inflammable solvent.

It has been found that solvents chosen from the class consisting of ethers, esters, chlorinated hydrocarbons, ketones, and hydrocarbons, have certain advantages over other classes of solvents such as nitroparaffins, brominated hydrocarbons, or the like. A number of mixtures of solvents from the desired classes can be devised having a combination of properties, such as volatility and non-inflammability if deemed important.

The coating composition of the present invention consists of a mixture of a silicone selected in accordance with the rules set forth above and a solvent selected in accordance with the rules set forth above. A wide range of proportions of solvent and silicone are operable. If the concentration of the silicones in the solvent is allowed to fall below 1%, an excessive amount of the coating composition is necessary to accomplish the purpose of the invention. If the percentage of silicone in the solvent exceeds 50%, or exceeds the solubility of that particular silicone in that particular solvent unsatisfactory results are obtained. A concentration of about 10% silicone is quite suitable. The concentration of the silicones in the solvent should be so controlled that the viscosity of the coating composition is low enough to make a free flowing runny liquid. The combination of the silicones and solvent should be such that it is not of an offensive odor.

The application of the coating composition involves several steps. In the development of the present invention, it was found that cleanliness is of great importance in the process. A used pan should first be cleaned as completely as possible with scouring powder and water and allowed to dry. If the pan has previously been treated according to the present invention, and if the treatment is no longer effective because of considerable scorching or other difficulties, the silicone treatment should be first removed with an organic solvent and the pan should be rubbed with scouring powder and water and allowed to dry. Then the pan, whether new or used, should be thoroughly cleaned with a volatile organic solvent. A cloth should be wet with the volatile organic solvent and the food implement scrubbed and wiped as clean as possible with the organic solvent and cloth. It is important to cover every portion of the surface in this solvent wiping.

It is believed that the silicone seals the pores of the metal surfaces so that carbon or other contaminating substances cannot enter the pores and, therefore, will not stick or adhere to the metallic surface. In any event a strong adhesive bond exists between the silicone and the metallic surface.

The silicone may be applied to the cleaned surface of the implement in any suitable or desired manner.

It is to be understood that both the inside and outside of cooking implements should be treated in accordance with this invention so that not only will the need for greases, oils and fats be eliminated but also the underside of the utensil in contact with open flames will be protected from staining and corrosion.

As examples of suitable silicones, reference is made to certain commercially available materials. Silicone greases are preferred. Some of the forms which have been shown to be operable for the present invention include insulation grease, stopcock grease, high vacuum grease, and lubricating grease. Altho the making of particular silicones is almost as much of an art as a science, and altho the silicone industry is characterized by considerable secrecy of formulas, it is understood that the commercially available high vacuum greases, stopcock greases, anti-foam greases, and lubricating greases, are all examples of methyl silicones of a relatively high molecular weight, for example, having a molecular weight greater than 2000. It is also understood that the molecular structure of said greases is intermediate between the linear skeletons of silastic and many silicone oils on the one hand and the complex, interknit three-dimensional network of the resins and thermosetting silicones on the other hand. That is, the greases are believed to be branched chain non-thermosetting silicones.

In the field of hydrocarbon greases, it is known that a semi-solid grease-like consistency is attained either by high molecular weight of non-linear molecules, or by the addition of suitable gelation agents, such as metallic soaps, to liquid hydrocarbons. In the early days of manufacture of silicones, some greases were made by the addition of suitable gelation agents to liquid silicone oils. Graphite and other fillers have sometimes been employed in silicone greases. Only those silicone greases essentially free from such gelation agents and fillers are the preferred greases of the present invention.

In the manufacture of silicone greases, small amounts of silica have sometimes become dispersed in the grease. Such traces of silica do not make the grease entirely unsuitable for the present invention. Whenever it is desired to eliminate the trouble caused by such traces of silica, solvent extraction may be employed. Selective solvent extraction with a suitable solvent dissolves substantially all of the silicone grease, but leaves the silica entrained in the sludge which settles after some time.

As an example of a liquid silicone found to be operative, reference is made to a lubricating oil sold as a 1000 centistoke silicone, and suspected of being a phenyl silicone of relatively linear structure.

As an example of a suitable solvent, reference is made to tetrachloroethylene, which is capable of dissolving very stiff high vacuum grease with little sedimentary sludge. Methylene chloride, which is one of the least toxic of the volatile, noninflammable solvents, can dissolve soft grease such as anti-foam grease reasonably well. Trichloroethylene, butyl ether, isopropyl ether, diethyl oxalate, amyl acetate, methyl hexyl ketone, cyclohexanone, xylene, cyclohexane, and toluene are further examples of suitable solvents.

As an example of a coating composition, 10 parts by weight of a high vacuum grease were dissolved in 90 parts by weight of tetrachloroethylene. As a second example, also, 15 parts by weight of an anti-foam grease were dissolved in 85 parts of methylene chloride. Ten parts by weight of a 1000 centistoke silicone lubricating oil could be dissolved in a solvent mixture consisting of ten parts each of buyl ether, isopropyl ether, diethyl oxalate, amyl acetate, methyl hexyl ketone, cyclohexanone, xylene, cyclohexane, and toluene to prepare a third example of a coating composition.

The silicone is desirably applied promptly after the cleaning with the volatile solvent, and without significant delay.

The term silicone is designed to cover polymeric alkylated siloxy compositions, and to exclude mere esters of silicic acid, the monomeric alkylated silicon halides employed in silicone manufacture, and organic silicon compounds not characterized by the silicon-oxygen bond.

The methyl silicones of the present invention are characterized by the dimethylsiloxy group

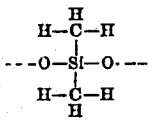

in which the methyl groups are attached to the silicon atoms. Silicones are sometimes accurately described as chains characterized by alternate silicon and oxygen atoms. Among methyl silicones, only those having a great number of dimethylsiloxy groups per molecule possess the necessary physical properties discussed. A minimum of 20 dimethylsiloxy groups per average molecule is the narrowing limitation excluding most of the silicones which might be conceived and provides a standard by which a person could order a suitable silicone from a silicone manufacturer. Some of the silicones having the necessary 20 dimethylsiloxy groups per average molecule also contain other groups such as monopropyltrioxysilane, tributylmonooxysilane, and other modifiers. The molecular weight of a suitable grease is greater than 2000 by ultimate viscosity techniques.

Having described our invention, what we claim as new and desire to secure by Letters Patent is:

1. A metallic cooking implement having a cooking surface consisting of a thin film of a non-thermosetting silicone, said film imparting to the cooking implement an improved susceptibility for easy cleaning.

2. A metallic cooking implement having a cooking surface consisting of a very thin film of a permanently viscous, non-thermosetting, high molecular weight alkylated siloxy composition in which most of the silicon atoms are attached to two carbon atoms, said film providing a surface very easily cleaned, and said film being so thin and adhered to the metal so firmly that the silicone is not transferred onto the food cooked thereon.

3. The article of claim 2 in which the siloxy composition is insoluble in olein, has a high degree of adhesive affinity for metals, a semi-solid greaselike consistency, a decomposition temperature of at least 500° F., and is free from sulfur, arsenic, and other odoriferous and poisonous constituents.

PAUL S. WEBB.
JOHN R. KOSTER.

REFERENCES CITED

The following references are of record in the file of this patent:

UNITED STATES PATENTS

| Number | Name | Date |
|---|---|---|
| 1,970,723 | Wolfe | Aug. 21, 1934 |
| 2,034,057 | Reuss | Mar. 17, 1936 |
| 2,382,082 | McGregor et al. | Aug. 14, 1945 |
| 2,384,389 | McGregor et al. | Sept. 4, 1945 |
| 2,386,259 | Norton | Oct. 9, 1945 |
| 2,439,689 | Hyde | Apr. 13, 1948 |

FOREIGN PATENTS

| Number | Country | Date |
|---|---|---|
| 436,229 | Great Britain | Oct. 7, 1935 |
| 572,740 | Great Britain | Oct. 22, 1945 |
| 585,167 | Great Britain | Jan. 31, 1947 |

OTHER REFERENCES

"Silicones," "Chemical Industries," page 230, Nov. 1945.

"Organo-Silicon Compounds," "Chemical Industries," page 222, Aug. 1944.

"Silicones-High Polymeric Substances," Bass et al., a reprint of an article from Modern Plastics, Nov. 1944.

"Organic Silicon Compounds for Insulating Electric Machines," a reprint of a Transaction of the American Institute of Electrical Engineers, delivered in the Winter Meeting Jan. 22-26, 1945.

"The Silicones," "Plastics" (of Chicago), page 40, Jan. 1945.

Dow-Corning Fluids, a publication of the Dow Corning Corp., pages 2-7, dated Feb. 17, 1945.

"Silicones," "Chemistry and Industry," page 365, Nov. 24, 1945.

"Silicones," "Rubber Age," page 230, Nov. 1945.

Scientific American, Sept. 1946, pages 105-107.

Rochow, "The Chemistry of Silicones," Oct. 1, 1946, page 87.

Sanderson, "Silicones," British Plastics, Oct. 1946, pages 459-464.

Bass, "Silicones—New Engineering Materials," Chemistry and Industry, April 5, 1947, pages 171-176.

Patterson, "Silicone Resins in Finishes," Organic Finishing, Apr. 1947, pages 32, 33, 36 and 37.

Fortune, "The Silicones," May 1947, page 227.